April 20, 1965

J. VERSTRATEN 3,179,780

DEVICE FOR HEATING DEEP-FROZEN EATABLES
WITH THE AID OF MICROWAVES

Filed Nov. 3, 1961

INVENTOR
BY JAN VERSTRATEN
AGENT

3,179,780
DEVICE FOR HEATING DEEP-FROZEN EATABLES WITH THE AID OF MICROWAVES

Jan Verstraten, Emmasingel, Eindhoven, Netherlands, assignor to North American Philips Company, Inc., New York, N.Y., a corporation of Delaware
Filed Nov. 3, 1961, Ser. No. 149,992
Claims priority, application Netherlands, Nov. 17, 1960, 258,074
8 Claims. (Cl. 219—10.55)

This invention relates to devices by which deep-frozen eatables on a thin dish made of a material substantially free of loss may be prepared for consumption by heating with the aid of microwaves.

It is known to mould the dishes for use in devices of this kind from polymethylmethacrylate, known under different denominations such as plexiglass, pyropex and plexigum. As a rule, partition walls have been moulded in the dish, dividing it into two or more partitions so that different kinds of food such as meat, vegetables and potatoes may be heated simultaneously without contacting one another.

A disadvantage involved with the use of this kind of device is that the heated food often shows phenomena of burning or at least drying out, rendering it less tasty for consumption.

The invention is based on recognition of the fact that these phenomena which occur substantially at the outer periphery of the dish and to a lesser extent along the partitions, are attributable to strong local concentrations of field due to discontinuities in the dielectric constant. The dielectric constant of air has a value approximately equal to one, whereas the dielectric constant of most foodstuffs, for example, is equal to five or higher. Therefore, at the periphery of the dish containing the substance to be heated, there is a sharp discontinuity between the dielectric constant of the air outside the dish and the dielectric constant of the substance to be heated within the dish. This sharp discontinuity in the dielectric constant occurring at the periphery of the dish results in the aforesaid high local concentrations of electric field at the periphery of the dish, resulting in increased heating of the peripheral portions of the foodstuffs which are adjacent thereto. Therefore, even if due care is taken to insure uniform distribution of the high frequency energy throughout the substance to be heated, there is nevertheless the problem of peripheral burning caused by the local electric field concentrations at the periphery caused by the difference in the dielectric constants of the air and the substance to be heated. It is an object of the invention to provide a simple apparatus which substantially eliminates the aforesaid problem. The phenomenon occurring at the outer periphery, which is the more serious problem, will be referred to hereinafter as the peripheral burning and the phenomenon occurring at the partitions will be referred to as the sector burning.

According to the invention, peripheral burning may be avoided by using a flat open container which is thick-walled as compared with the dish and in which the dish is a close fit, the container being made of a material substantially free of loss having a dielectric constant about equal to the mean dielectric constant of the food to be heated. The sector burning may be avoided in accordance with the invention if the partitions, which are usually moulded from materials free of loss similar to that of the dish, are made as thin as possible.

In order that the invention may be readily carried into effect, it will now be described in detail, by way of example, with reference to the accompanying diagrammatic drawing, in which.

Figure 1:
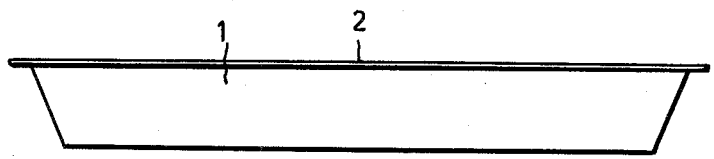
FIGURE 1 is a side view of the dish.

A dish 1, shown in side-view in FIGURE 1, is moulded from plexiglass or another heat-resistant material free of loss. Its wall thickness is small, for example 0.5 mm. The dish 1 has a flat, outwardly projecting upper edge or lip 2 which, when the dish 1 is placed in a container 3, comes to bear on an upper edge 4 thereof (see FIGURE 2). The dish 1 also has three partitions 5 which may be moulded with the dish in one piece. The wall thickness of the partitions is chosen to be so small as is justified in view of the task to be fulfilled by them, for example 1 mm. thick.

Figure 2:
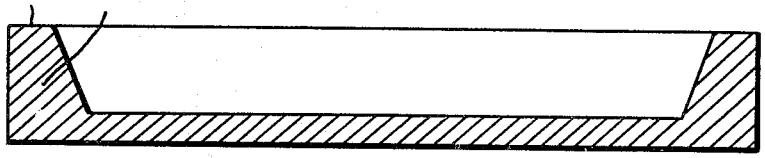
FIGURE 2 is a vertical sectional view of the centre of the container.
Figure 3:
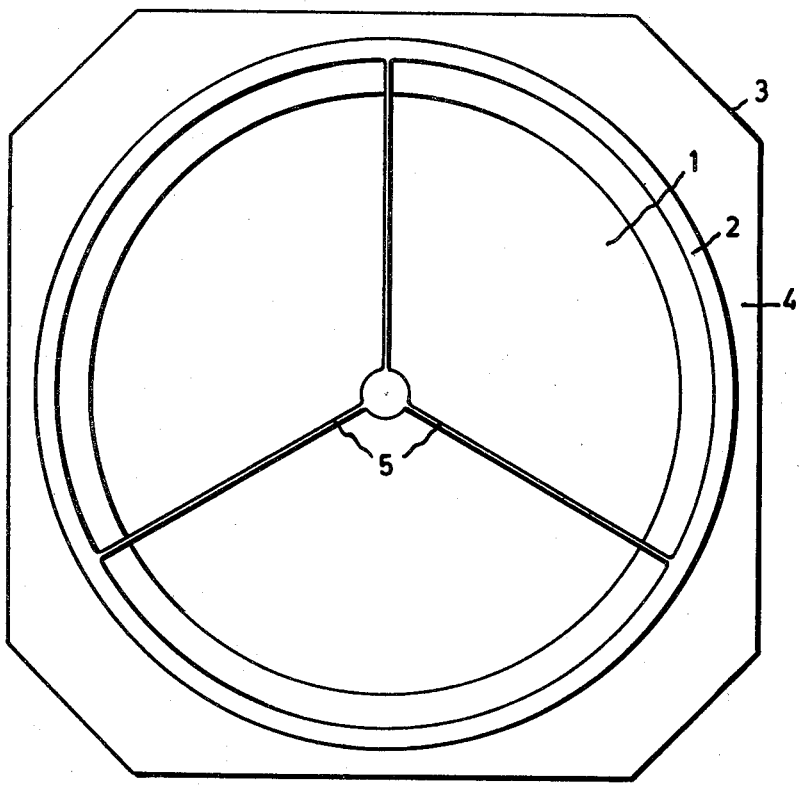
FIGURE 3 is a plan view of the container with a dish placed in it.

The open container 3, which is shown in section in FIGURE 2 and in plan view in FIGURE 3, is made of a refractory material, substantially free of loss, having a dielectric constant about equal to the mean dielectric constant of the food to be heated, for example 5 or higher.

When the dish 1 containing the food to be heated is placed in the container 3, in which it must be a close fit, the discontinuity in the dielectric constant is displaced from the surface of the dish to the outer surface of the comparatively thick container where the resulting local heating is not harmful. Peripheral burning then no longer occurs.

The sector burning, which in comparison therewith was manifest already to a lesser extent, is minimized by giving the partitions 5, as previously mentioned, as small a wall thickness as possible.

What is claimed is:

1. Apparatus for heating a substance by means of high frequency radio energy, comprising a receptacle made of low-loss dielectric material containing therein the substance to be heated, a thick-walled low-loss dielectric container shaped to receive said receptacle in close contact, said receptacle being freely removable from said container, and said container being made of a material having a dielectric constant approximately equal to the dielectric constant of the substance to be heated.

2. Apparatus for heating a substance by means of microwave energy comprising a thin walled receptacle composed of a low-loss dielectric material and containing therein said substance to be heated, a low-loss dielectric container having walls substantially thicker than the walls of said receptacle and being open at one end, said container being shaped to receive said receptacle, the walls of said receptacle closely engaging the walls of said container, said receptacle being freely movable into and out of said container and said container being composed of a material having a dielectric constant approximately equal to the mean dielectric constant of the substance to be heated.

3. Apparatus for heating a refrigerated food substance by means of microwave energy comprising a thin walled dish composed of a low-loss dielectric material, said dish containing therein the food substance to be heated, a flat container open at one end and having peripheral walls substantially thicker than the peripheral walls of said dish, said container being shaped to receive said dish in close contact and said dish being freely removable from said container, and said container being made of a low-loss dielectric material having a dielectric constant approximately equal to the mean dielectric constant of the food substance to be heated.

4. Apparatus for heating a refrigerated food substance by means of microwave energy comprising a thin walled dish having a peripheral lip and composed of a low-loss dielectric material, said dish containing therein the food substance to be heated, a low-loss dielectric container having walls substantially thicker than the walls of said dish, said container being shaped to receive and support said dish in close contact, said container and dish having complementary shapes and said dish being freely removable from said container, and said container being made of a material having a dielectric constant approximately equal to the mean dielectric constant of the food substance to be heated so that at the surface of said dish sharp discontinuities in the value of dielectric constants are substantially eliminated.

5. Apparatus as described in claim 4 wherein said dish is partitioned into two sections by means of a relatively thin partition wall of low-loss dielectric material.

6. Apparatus as described in claim 4 wherein said dish has a substantially circular cross-section and said container includes a recess of similar configuration for receiving said dish.

7. Apparatus for heating a dielectric substance by means of radio frequency energy, comprising a thin walled receptacle made of a low-loss dielectric material and containing therein said substance to be heated, and a thick walled low-loss dielectric container shaped to receive said receptacle in close contact, said receptacle being freely removable from said container, said container being composed of a material having a dielectric constant approximately equal to the mean dielectric constant of the substance to be heated.

8. Apparatus for heating a dielectric substance by means of radio frequency energy comprising a thin walled receptacle composed of a low-loss dielectric material and containing therein said substance to be heated, a low-loss dielectric container composed of a refractory material and having walls substantially thicker than the walls of said receptacle and being open at one end, said container being shaped to receive said receptacle whereby the walls of said receptacle closely engage the walls of said container, said container being composed of a material having a dielectric constant approximately equal to the mean dielectric constant of the substance to be heated.

References Cited by the Examiner
UNITED STATES PATENTS

| | | | |
|---|---|---|---|
| 1,526,397 | 2/25 | Thornton | 206—4 |
| 2,178,812 | 11/39 | Schade | 220—69 |
| 2,540,036 | 1/51 | Spencer | 219—10.55 X |
| 2,612,596 | 9/52 | Gross | 219—10.55 |
| 2,830,162 | 4/58 | Copson et al. | 219—10.55 X |
| 2,856,497 | 10/58 | Rudenberg | 219—10.55 |

RICHARD M. WOOD, *Primary Examiner.*

MAX L. LEVY, *Examiner.*